Patented Aug. 30, 1949

2,480,475

UNITED STATES PATENT OFFICE 2,480,475

REFRACTORY

Arthur F. Johnson, Cambridge, Mass., assignor to Reynolds Metals Company, Richmond, Va., a corporation of Delaware No Drawing. Application March 12, 1946, Serial No. 653,967

4 Claims. (Cl. 106—57)

This invention relates to compositions of matter and has for its object the provision of an improved refractory material. My invention provides a refractory comprising aluminum nitride (AlN) and alumina ($Al_2O_3$) which are compounded together in a fusion operation. The refractory of the invention is hard, vitreous and dense, and is possessed of properties making it very desirable for use in various chemical, electrochemical, and metallurgical operations.

The refractory of the invention is characterized by a high melting point, high resistance to such fusions as the cryolite fusions used in the electrolysis of aluminum, high electrical resistivity, and a dense vitreous structure making it resistant to absorption or penetration.

The refractory is advantageously formed of aluminum nitride and a fairly pure form of alumina, for example, the Bayer process alumina which is substantially free of oxides reducible by aluminum such as iron oxide. The aluminum nitride may be formed by heating fine aluminum powder, say, minus 100-mesh, with powdered charcoal, to a temperature around 1000° C. in the atmosphere to convert the aluminum to its nitride. The aluminum nitride may be formed into consolidated lumps by heating.

Refractory compositions of the invention, especially in the binary form, comprise from 15% to 50% of aluminum nitride with the balance substantially all alumina. Refractories in the higher range of aluminum nitride have melting points in the neighborhood of 2200° C., while those in the lower range have melting points in the neighborhood of 1900° C. A small amount of cryolite, say, up to 20%, may be incorporated in the refractory to lower its melting or softening point when that is desirable as, for example, in forming a granular material for paste or mortar. Other compositions may include either zirconia or silica, or both, in substitution for a part of the alumina. I may replace as much as 30% of the alumina with those compounds; for example, I may use from 0 to 10% of silica, from 0 to 20% of zirconia, and the balance alumina and aluminum nitride, together with the impurities usually accompanying these raw materials when in fairly pure forms.

While the refractories have general utility, they are very effective for use in the aluminum and glass industries. One of the most advantageous uses of the refractory is in electrolytic reduction of aluminum in cryolite fusions of alumina. The refractory seems to be inert to cryolite at temperatures around 1000° C. and higher, and provides an excellent lining for reduction cells and other like vessels.

The refractory of the invention may be produced in any suitable fusion operation. In one suitable method, I fuse the materials together in an electrically heated graphite crucible. I have found it advantageous to use aluminum nitride lumps because they are less susceptible to oxidation. The required amount of alumina is placed on top of the aluminum nitride and the crucible is covered to exclude the atmosphere. The contents are heated until fluid and the resulting composition is cast in molds. The usual cooling and tempering of materials in a vitreous condition are observed. In heating the compositions to fluidify them, temperatures of from 2000° C. to 2300° C. are used, say, 100° C. above the softening or melting points of the particular refractory composition being prepared. The temperature should not exceed 2300° C. any appreciable amount because of the decomposition of aluminum nitride.

When walls or other structures are formed of bricks of the refractory, a motor or paste of the pulverized refractory containing cryolite may be used. This paste may be mixed with tar or compounds derived from tar, and when dried and heated to the operating temperature of the structure, it becomes fused to the bricks.

I claim:

1. A refractory vitrified composition consisting essentially of aluminum nitride in an amount varying from 15% to 50%, and from 50% to 85% of alumina.

2. A refractory comprising a vitrified composition of aluminum nitride in an amount varying from 15% to 50%, and the balance substantially all alumina.

3. A refractory comprising a vitrified composition of aluminum nitride in an amount varying from 15% to 50%, and the balance consisting of alumina and a compound of the group consisting of zirconia and silica.

4. A refractory vitrified composition comprising from 15% to 50% of aluminum nitride, from 0% to 20% of cryolite and the balance substantially all alumina.

ARTHUR F. JOHNSON.

REFERENCES CITED

The following references are of record in the file of this patent:

UNITED STATES PATENTS

| Number | Name | Date |
|---|---|---|
| 2,154,167 | Jenks | Apr. 11, 1939 |
| 2,345,211 | Neiman | Mar. 28, 1944 |
| 2,406,275 | Wejnarth | Aug. 20, 1946 |

FOREIGN PATENTS

| Number | Country | Date |
|---|---|---|
| 1,961 | Great Britain | 1912 |
| 396,532 | Great Britain | Aug. 10, 1933 |